Patented May 13, 1930

1,757,967

UNITED STATES PATENT OFFICE

ERIC C. KUNZ, OF MONTCLAIR, NEW JERSEY

STABILIZED ALDEHYDE OR ALDEHYDE-CONTAINING COMPOUND AND PROCESS OF MAKING THE SAME

No Drawing. Application filed July 14, 1927, Serial No. 205,852. Renewed February 18, 1930.

This invention concerns stabilized aldehydes or aldehyde-containing compounds and a process for making them.

Aldehydes as such or as contained in compounds such as essential oils quickly deteriorate under the influence of light, air or impurities as evidenced by the discoloration of the compounds and in their loss of strength. This action is especially objectionable in the case of aldehydes or aldehyde-containing compounds used in perfumes. For example, phenylacetic aldehyde, which is used in the manufacture of perfumes to imitate the odor of hyacinth, deteriorates so quickly by polymerization that in a few weeks the product can not be used. It is found that to keep the materials in dark colored well-stoppered bottles does not prevent the deterioration to any practical extent.

According to this invention it is found that aldehydes and aldehyde-containing compounds are stabilized by adding an hydroxy-carboxylic acid thereto. It is believed that the influence of light or air on such delicate organic chemicals as aldehydes is due to the catalytic action of impurities such as metals or metallic compounds in the chemicals. Such impurities are generally present in only very small amounts and consequently only very small amounts of the oxy-carbonic acid are necessary. As the amount of impurities varies the amount of acid added may be varied. It is thought that hydroxy-carboxylic acids and their derivatives poison these catalytic agents by forming a salt or other compound thereof.

These acids, especially in the minute quantities used, do not in any way affect either the taste, odor, color or properties of the treated compounds. They are non-poisonous and allow the stabilized products to be mixed with other materials without detrimentally affecting the latter. Acids of this type which have been used are tartaric, citric, tannic, malic and fumaric. They can be used as such or in the form of their derivatives, especially esters. It is immaterial whether these acids are added directly or in solution, but alcoholic solutions thereof are preferred.

As an example, phenylacetic aldehyde is treated with a trace of tartaric acid and is found to have, after several weeks, an aldehyde content only 5% less than when first treated. If this aldehyde, untreated, is kept in dark colored well-stoppered bottles it would show a loss of aldehyde content as high as 50% in about the same time. The quantity of acid used in the above example was only a trace, namely, about one-ten thousandth part by weight of the aldehyde. Preferably I employ a 1% alcoholic solution of the acid.

Another example is to treat oil of bitter almonds with a 1% alcoholic solution of tartaric acid, using about the same amount of acid as above in proportion to the aldehyde content of the oil. The oil thus treated remained stable for a considerable period without any particular loss of aldehyde content.

I claim:

1. As a new product of manufacture an aldehyde containing a hydroxy-carboxylic acid.

2. As a new product of manufacture an aldehyde containing a small amount of a hydroxy-carboxylic acid.

3. As a new product of manufacture an essential oil containing an aldehyde and a small amount of a hydroxy-carboxylic acid.

4. As a new product an aldehyde having impurities and containing an amount of hydroxy-carboxylic acid in proportion to the amount of the impurities.

5. As a new product an aldehyde having impurities in the form of metals or metallic compounds and containing a hydroxy-carboxylic acid in an amount proportionate to the amount of the impurities.

6. As a new product a stabilized aldehyde containing catalyzing metalliferous impurities and a hydroxy-carboxylic acid in proportion to the amount of impurities to poison the same.

7. As a new product of manufacture phenylacetic aldehyde containing a small amount of a hydroxy-carboxylic acid.

8. As a new article of manufacture phenylacetic aldehyde containing a small amount of tartaric acid.

9. As a new article of manufacture an aldehyde containing a 1% alcoholic solution of a hydroxy-carboxylic acid in an amount substantially equal to one-ten thousandth part by weight of the aldehyde.

10. A process of stabilizing aldehydes comprising adding to the aldehyde a hydroxy-carboxylic acid.

11. A process of stabilizing aldehydes comprising adding to the aldehyde a small amount of a hydroxy-carboxylic acid.

12. A process of stabilizing aldehydes comprising adding to the aldehyde a small amount of tartaric acid.

13. A process of stabilizing aldehydes comprising adding to the aldehyde a hydroxy-carboxylic acid in an amount substantially equal to one-ten thousandth part of the aldehyde.

14. A process of stabilizing a compound containing an aldehyde comprising adding to the compound a hydroxy-carboxylic acid in an amount substantially equal to one-ten thousandth part of the aldehyde content.

15. A process of stabilizing an aldehyde comprising adding to the aldehyde a 1% alcoholic solution of a hydroxy-carboxylic acid in an amount substantially equal to one-ten thousandth part by weight of the aldehyde.

Signed at New York city, in the county of New York and State of New York this 12th day of July A. D. 1927.

ERIC C. KUNZ.